US009959196B2

(12) United States Patent
Wu

(10) Patent No.: US 9,959,196 B2
(45) Date of Patent: May 1, 2018

(54) UNIFICATION OF DESCRIPTIVE PROGRAMMING AND OBJECT REPOSITORY

(71) Applicant: Verizon Patent and Licensing Inc., Arlington, VA (US)

(72) Inventor: Peng Wu, Wellesley, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 959 days.

(21) Appl. No.: 14/333,036

(22) Filed: Jul. 16, 2014

(65) Prior Publication Data

US 2016/0019129 A1  Jan. 21, 2016

(51) Int. Cl.
*G06F 9/44* (2006.01)
*G06F 11/36* (2006.01)

(52) U.S. Cl.
CPC .... *G06F 11/3664* (2013.01); *G06F 2201/865* (2013.01)

(58) Field of Classification Search
USPC ......................................................... 717/124
See application file for complete search history.

(56) References Cited

U.S. PATENT DOCUMENTS

| | | | | |
|---|---|---|---|---|
| 5,781,720 A * | 7/1998 | Parker | ................. | G06F 11/3688 714/38.11 |
| 2004/0107415 A1* | 6/2004 | Melamed | ............ | G06F 11/3684 717/124 |
| 2008/0270841 A1* | 10/2008 | Quilter | ................ | G06F 11/3672 714/38.1 |
| 2009/0070742 A1* | 3/2009 | Voruganti | ........... | G06F 11/3688 717/124 |
| 2009/0217302 A1* | 8/2009 | Grechanik | ................ | G06F 8/70 719/320 |
| 2011/0202901 A1* | 8/2011 | Givoni | ................ | G06F 11/3414 717/125 |
| 2013/0332905 A1* | 12/2013 | Vikutan | .............. | G06F 11/3684 717/124 |
| 2015/0100829 A1* | 4/2015 | Nanjundappa | ...... | G06F 11/0748 714/38.1 |
| 2015/0286556 A1* | 10/2015 | Ellis | .................... | G06F 11/3684 717/125 |

* cited by examiner

*Primary Examiner* — Chameli Das

(57) ABSTRACT

A computer device may include logic configured to provide a centralized library for descriptive programming and other types of object descriptions to a testing script engine. The descriptive programming library may store test object descriptions for test objects associated with an application under testing. The logic may be further configured to provide a unification layer over all the object description types and to provide inheritance among the objects at the unification layer. The logic may be further configured to store a test object description, associated with a test object, in the descriptive programming library; identify a reference to the test object in a descriptive programming statement associated with the testing script engine; access the stored test object description in the descriptive programming library based on the identified reference to the test object; and identify an application object, associated with the application under testing, based on the stored test object description.

20 Claims, 13 Drawing Sheets

| | |
|---|---|
| OBJECT REPOSITORY 812 | Browser("app:br").Page("app:p").WebElement("some:l") |
| DESCRIPTIVE PROGRAMMING STYLE #1 814 | Browser("title:=app").Page("title:=app").WebElement("innertext:=something") |
| DESCRIPTIVE PROGRAMMING STYLE #2 816 | Set Dbr = Description.Create<br>Dbr("title").value = "app"<br>Set Dp = Description.Create<br>Dp("title").value = "app"<br>Set Dl = Description.Create<br>Dl("innertext").value = "something"<br>Browser(Dbr).Page(Dp).WebElement(Dl) |
| UNIFIED USER INTERFACE OBJECT 818 | CO("app:br").CO("app:p").CO("some:l") |

FIG. 8A

| | |
|---|---|
| DESCRIPTIVE PROGRAMMING STYLE 822 | set desc = Description.Create<br>desc("innertext").value = "Search based on.*"<br>desc("html tag").value="B" |
| DESCRIPTIVE PROGRAMMING LIBRARY STYLE 824 | dOS.desc "Search:Search based on:!",<br>Array("innertext:=Search based on.*","html tag:=B") |
| UTILITY TOOL STYLE 826 | Set Desc = MakeDescription(Array("innertext:=Search based on.*","html tag:=B")) |

FIG. 8B

| | |
|---|---|
| DESCRIPTIVE PROGRAMMING STYLE 832 | set desc = Description.Create desc("innertext").value = "Search based on"&name Browser("...").Page("...").WebElement(desc) |
| DESCRIPTIVE PROGRAMMING LIBRARY OBJECT 834 | dOS.desc"Search:Search based on(name):!", Array("innertext:=Search based on @name@") dOS.desc"Report:item[e][i]:tbl, Array("xpath:=//ul[@e@]/p/cite[text()=Event]/../../div/ol/ul[@i@]/div/table") |
| UNIFIED USER INTERFACE OBJECT 836 | CO("...").CO("...").COC("Search:Search based on (name):!", array("name="&name)) ...COC("Report:item[e][i]:tbl", array("e=1", "i=1")) |
| UTILITY TOOLS 838 | Browser("...").Page("...").WebElement(dOS. GetDescDS("Search:Search based on(name):!", array("name= "&name))) Browser("...").Page("...").WebElement(dOS. GetDescDS("otf:!",Array("innertext:=Search based on "&name) Set Desc = CopyDescription(dOS.GetDescD("Search:Search based on(name):!") descriptionValueReplace Desc, "name" , "@", "Location" Browser("...").Page("...").WebElement(Desc) |

| | |
|---|---|
| DESCRIPTIVE PROGRAMMING STYLE 842 | set desc = Description.Create desc("innertext").value = "Search based on.*" Desc("micclass").value = "WebElement" Browser(" ... ").Page(" ... ").ChildObjects(desc) |
| UNIFIED USER INTERFACE OBJECT 844 | dOS.desc "Search:Search based on():l", Array("innertext:=Search based on.*") CO(" ... ").CO(" ... ").COC("Search:Search based on():l",array()).testobjects |
| UTILITY TOOL 846 | dOS.getTestObjects(Browser(" ... ").Page(" ... "), "Search:Search based on():l") |

FIG. 8D

| | |
|---|---|
| METHOD DEFINITION SYNTAX 852 | ObjectDesc::defineMethod <obj name>, <method name>, <implementation function on object>, <implementation function on cached text>, <user data> |
| METHOD DEFINITIONS 854 | dOS.defineMethod "Report:Event[e]:tbl", "property", "innerTextPropertyA", "getPropertyA", Array("Event") <br><br> dOS.defineMethod "Report:Request:l", "property", "innerTextPropertyA", "getPropertyA", Array("PPT ID") <br><br> dOS.defineMethod "Impact:Impacts:tbl", "property", "propertyA", "tableCellDataByRowNumColNum", "", Array("Table:Header:(columnName):l", "columnName") |
| METHOD INVOCATION STATEMENTS IN UNIFIED SYNTAX 856 | CO("....")...CO("Report:Request:l").DO1("property", "one arg") <br> CO("....")...CO("Impact:Impacts:tbl").DO2("propertyA", 1,"one arg") <br> CO("....")...CO("Impact:Impacts:tbl").DOX("propertyA", Array(1,"one arg")) |

FIG. 8E

```
Set methodSet = NewObjectMethodSet
MethodSet::DefineMethod <method name>, <implementation function on object>,
<implementation function on cached text>, <user data>
ObjectDesc::inheritMethod <obj name>, <method set>
addMethodSet <methodSetRepository object>, <method set name>, <method set>
```

METHOD INHERITANCE SYNTAX 862

FIG. 8F

UNIFICATION OF DESCRIPTIVE PROGRAMMING AND OBJECT REPOSITORY

BACKGROUND INFORMATION

A software development process may include a planning process to determine the requirements of a software application or system, a design process that includes developing functional units and writing source code, and a testing process to validate and verify that a particular functional unit, application, and/or software system is functioning properly. Software testing may be used to uncover defects (i.e., "software bugs") and/or to determine whether the software under testing satisfies particular requirements, such as testability, maintainability, usability, performance, and/or security requirements.

BRIEF DESCRIPTION OF THE DRAWINGS

FIGS. 8A-8F are diagrams of exemplary testing scripts according to an implementation described herein.

DETAILED DESCRIPTION OF PREFERRED EMBODIMENTS

Figure 1:
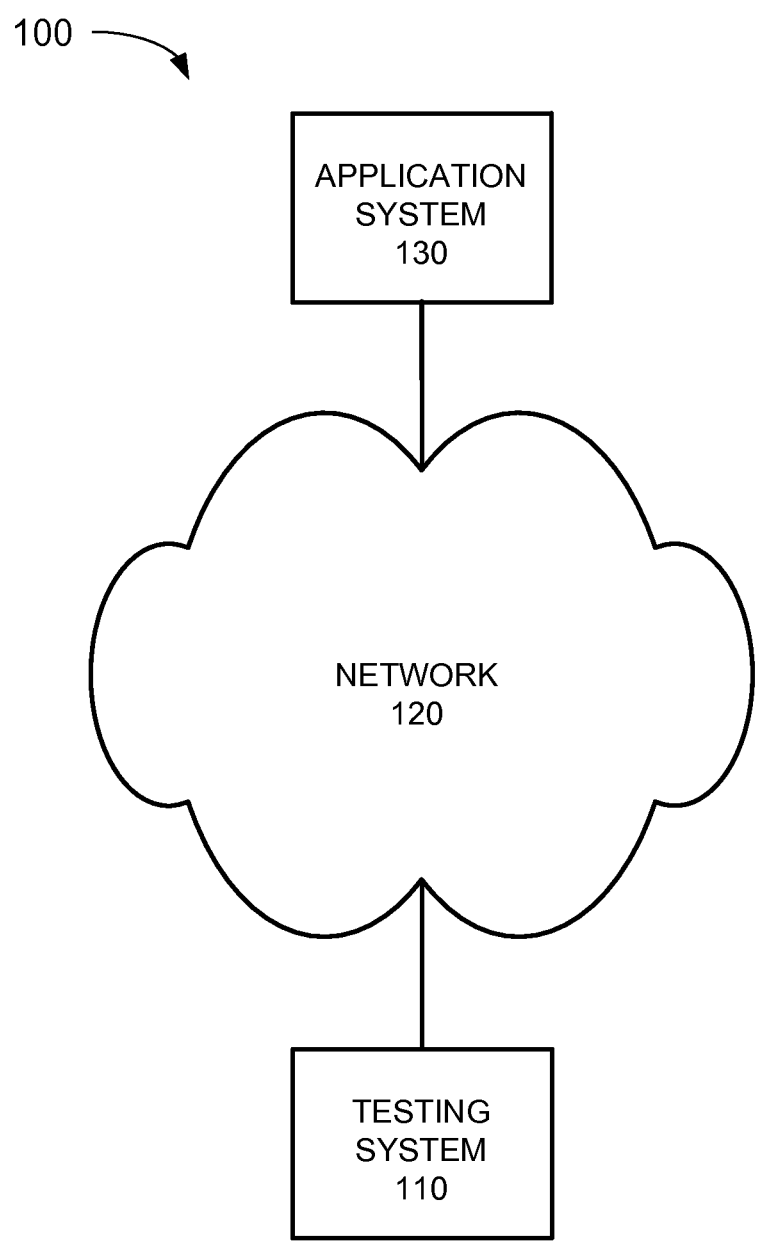
FIG. 1 is a diagram illustrating an exemplary environment according to an implementation described herein.

The following detailed description refers to the accompanying drawings. The same reference numbers in different drawings identify the same or similar elements.

A testing system may be used to test a software application. The software application, referred to herein as an application under testing (or application under test), may include application objects. An application object may correspond to a functional unit with particular requirements. For example, if the application under testing includes a web page, the application objects may include HyperText Markup Language (HTML) elements, such as a button, a text input box, a clickable image, and/or a hyperlink.

The testing system may perform a test by running a script with respect to the application under testing. The script may specify particular actions that are to be performed on particular test objects. For example, the script may specify that a test object button be clicked or that a particular input string be entered into a test object text input box. When the script is executed, the testing system may need to match the test objects included in the script with application objects included in the application under testing.

In order to match a test object with an application object, the testing system may need to identify an application object that matches a description of a test object. A description of a test object may include, for example, a list of one or more properties, and corresponding one or more property values, for the test object. Two different techniques may be available in the testing system for matching test objects with application objects.

In one technique, test objects may be included in an object repository. The object repository may correspond to a centralized data store of test objects and descriptions for an application under testing. An object description in the object repository may include a list of properties for the test object along with corresponding property values. Thus, a testing script that uses the object repository may only need to specify a test object name and the testing system may obtain the test object description from the object repository and use the test object description to identify an application object in the application under testing. An object repository may thus facilitate testing by providing a centralized store of test objects that may be accessed by multiple test scripts without having to provide a test object description. In another technique, test objects may be specified using descriptive programming. In descriptive programming, a test object description may be included in a script statement. Thus, for example, a descriptive programming script statement may include a list of test object properties and corresponding property values.

While an object repository may provide a more efficient technique of testing an application in many situations, in some situations, descriptive programming may be preferred. As an example, a test object may be associated with a dynamic property (e.g., a property with a property value that may be subject to change) and a descriptive programming statement may be changed to include a different property value, without affecting other descriptive programming statements that include the test object. As another example, multiple identical application objects may require the same operations and an object repository may not be able to distinguish between the identical application objects. As yet other examples, an object repository may not exist, may be incomplete, or may be too large to be efficiently used. Thus, in some situations, use of an object repository may be preferred, while in other situations, use of descriptive programming may be preferred.

However, use of descriptive programming may result in inefficiencies in generating testing scripts, as no centralized store of objects may exist and script writers may need to continue to type in test object descriptions when writing descriptive programming statements. Furthermore, the test scripts may need to be rewritten significantly when changing from the object repository to descriptive programming or when changing from descriptive programming to the object repository.

Implementations described herein relate to providing a descriptive programming library to a testing script engine of a software testing system. In some implementations, the software testing system may correspond to Hewlett Packard Quick Time Professional (QTP). In other implementations, the software testing system may correspond to another software testing system. The descriptive programming library may store test object descriptions for test objects associated with an application under testing. A test object description may include a list of property names and corresponding property values. For example, the descriptive programming library may store a test object description associated with a test object and the testing script engine may identify a reference to the test object in a descriptive programming statement associated with the testing script engine, access the stored test object description in the descriptive programming library based on the identified reference to the test object, and identify an application object, associated with the application under testing, based on the stored test object description. Thus, in other words, the descriptive programming library may include a dictionary of test object definitions.

In some implementations, the stored test object description may be added to the descriptive programming statement in the script. In other implementations, the stored object description may be accessed when the testing script is being executed. Furthermore, the descriptive programming library may support dynamic property values for test object properties that may enable run time instantiation. For example, a test object description may not specify a property value for a particular property, or may specify the particular property only partially, and a reference to a test object in a descriptive programming may specify a property value. The specified property value may be assigned to the property when the script is executed.

Implementations described herein further include a utility library of descriptive programming functions provided to the testing script engine. The testing script engine may identify a reference to a utility function from the utility library and may execute the utility function when the script is executed. The utility library may include, for example, utility functions to return a stored test object description filtered based on a property specified in the reference to the utility function; return an array of object properties associated with a test object; replace a keyword in a stored test object description; add a property to a stored test object description; determine whether a particular property is included in a stored test object description; return a property value included in a stored test object description; and/or to perform another function relating to descriptive programming.

Implementations described herein further include providing a unified user interface layer to the testing script engine. The unified user interface layer may enable a script to reference test object descriptions stored in the descriptive programming library and to also reference test object descriptions stored in an object repository. For example, if a reference to a unified user interface test object is detected in a script, a determination may be made as to whether the unified user interface test object is associated with a test object description stored in the object repository or with a test object description stored in the descriptive programming library. If the unified user interface test object is associated with a description in the object repository, the test object description from the object repository may be used to identify an application object. If the unified user interface test object is associated with a description in the descriptive programming library, the test object description from the descriptive programming library may be used to identify an application object. A unified user interface test object may be associated with a preference. Thus, if a test object description is detected in both the object repository and the descriptive programming library, the test object description may be selected from either the object repository or the descriptive programming library based on the specified preference.

Furthermore, the unified user interface layer may enable the creation of child objects. A child unified user interface layer object of a parent unified user interface layer object may inherit one or more properties from the parent unified user interface layer object. Moreover, the unified user interface layer may provide for method inheritance. A method may perform a particular function in connection with a unified user interface layer object. A second unified user interface layer object may be configured to inherit a method from a first unified user interface layer object.

FIG. 1 is a diagram illustrating example components of an environment 100 according to an implementation described herein. As shown in FIG. 1, environment 100 may include a testing system 110, a network 120, and an application system 130. Testing system 110 may perform testing on application system 130 via network 120.

Testing system 110 may include one or more computer devices configured to perform automated software testing on a software system included in application system 130. Testing system 110 may include an object repository and may be configured to enable descriptive programming. Furthermore, testing system 110 may include a descriptive programming library and may include a unified user interface layer that unites the descriptive programming library and the object repository. In some implementations, testing system 110 may include one or more server devices and/or one or more client devices (e.g., desktop computers). The client devices may include one or more mobile computer devices, such as a tablet computer, a laptop computer, a mobile phone, a smart phone, a phablet computer device, a wearable computer device (e.g., a glasses smartphone device, a wristwatch smartphone device, etc.), and/or any other type of mobile computer device with communication functionality and a user interface.

Network 120 may include one or more circuit-switched networks and/or packet-switched networks. For example, network 120 may include a local area network (LAN), a wide area network (WAN), a metropolitan area network (MAN), a Public Switched Telephone Network (PSTN), an ad hoc network, an intranet, the Internet, a fiber optic-based network, a wireless network, and/or a combination of these or other types of networks. Network 120 may include one or more base stations (not shown in FIG. 1) that provide wireless access to network 120 for testing system 110 and/or application system 130. For example, the one or more base stations may include a Long Term Evolution eNodeB base station, a Global System for Mobile Communications (GSM) base station, a Code Division Multiple Access (CDMA) base station, and/or another type of base station.

Application system 130 may include one or more computer devices that include an application under development that is to be tested using testing system 110. The application may include, for example, one or more of a web application, a Web services application, a Main frame application, a Java™ application, an Oracle Application™, an ActiveX™ application, and/or another type of application under testing. In some implementations, application system 130 may include one or more server devices and/or one or more desktop computer devices. In other implementations, application system 130 may include one or more mobile computer devices, such as a tablet computer, a laptop computer, a mobile phone, a smart phone, a phablet computer device, a wearable computer device (e.g., a glasses smartphone device, a wristwatch smartphone device, etc.), and/or any other type of mobile computer device with communication functionality and a user interface.

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
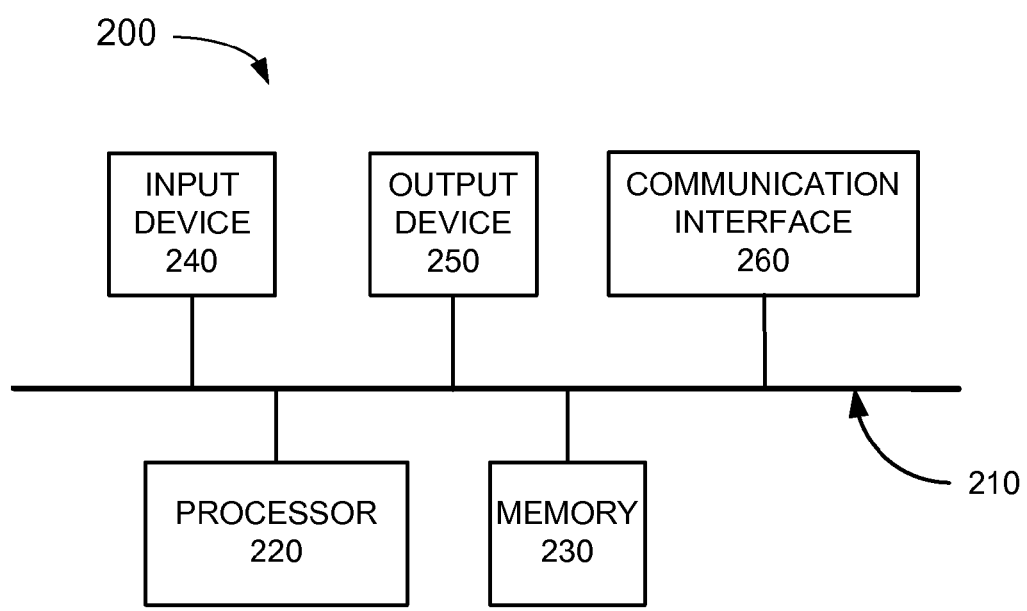
FIG. 2 is a diagram illustrating exemplary components of the testing system of FIG. 1.

FIG. 2 is a diagram illustrating exemplary components of device 200 according to an implementation described herein. Testing system 110 and/or application system 130 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to: a descriptive programming library; a unified user interface object layer; and/or automated software testing and other operations described herein. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than those depicted in FIG. 2. Additionally or alternatively, one or more components of device 200 may perform one or more tasks described as being performed by one or more other components of device 200.

Figure 3:
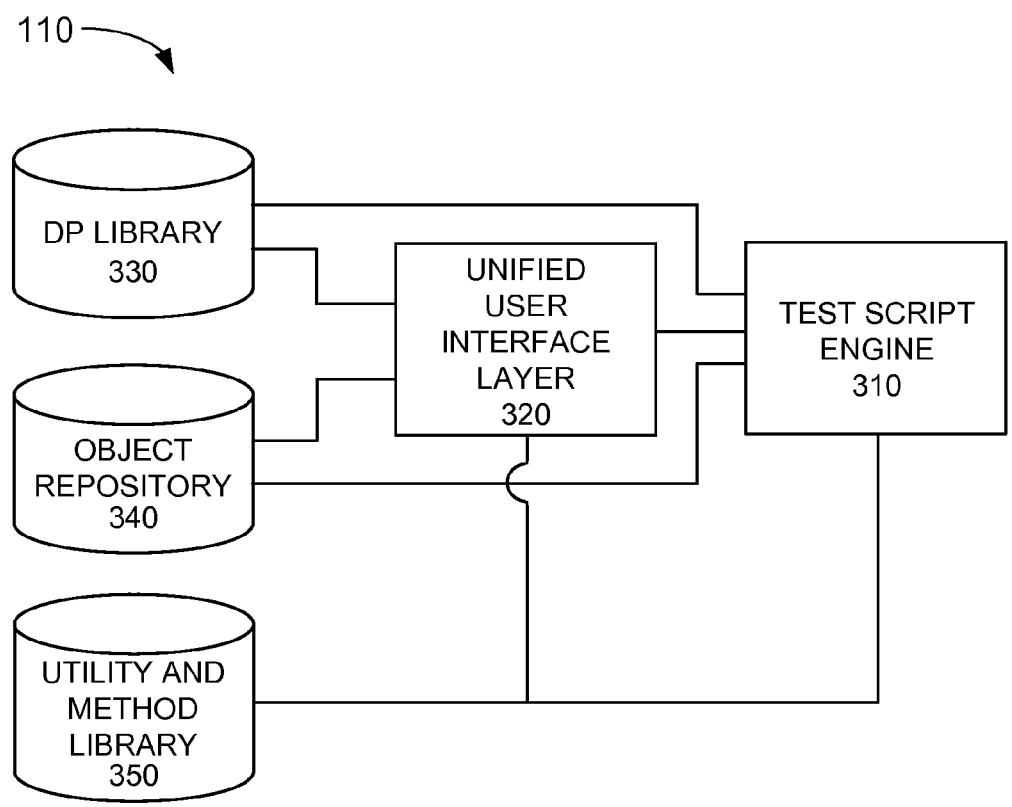
FIG. 3 is a diagram illustrating exemplary functional components of the testing system of FIG. 1.

FIG. 3 is a diagram illustrating exemplary functional components of testing system 110 according to an implementation described herein. The functional components of testing system 110 may be implemented, for example, via processor 220 executing instructions from memory 230. As shown in FIG. 3, testing system 110 may include a test script engine 310, a unified user interface layer 320, a descriptive programming (DP) library 330, an object repository 340, and a utility and method library 350.

Test script engine 310 may enable generation and/or editing of testing scripts. For example, test script engine 310 may include a text editor configured to receive text input to generate test script statements in a particular scripting language, such as Visual Basic Script (VBScript). Furthermore, test script engine may execute a test script and may access a test object description stored in descriptive programming library 330 and/or stored in object repository 340 based on a reference to a test object (e.g., a test object name) included in a script statement. If a test object is defined using unified user interface layer 320, test script engine 310 may access the test object description via unified user interface layer 320. In some implementations, test script engine 310 may access a test object description in descriptive programming library 330 and may add the test object description to a descriptive programming statement in a script based on a reference to the test object associated with the test object description. During execution of a script, test script engine 310 may match a test object description with an application object in application system 130 and may perform one or more actions on the identified application object based on instructions included in the test script in connection with a test object that matches the identified application object.

Unified user interface layer 320 may provide a unified user interface layer that may be used to define a test object. If a testing script statement includes a reference to a unified user interface layer test object, unified user interface layer 320 may determine whether the unified user interface layer test object is associated with a test object description in descriptive programming library 330 or in object repository 340 and may select the corresponding test object description. If a test object description exists in both descriptive programming library 330 and object repository 340, a test object description may be selected based on a preference associated with the test object.

While implementations described herein correspond to a unified user interface layer that enables a script to reference test object descriptions stored in the descriptive programming library and to also reference test object descriptions stored in an object repository, in other implementations the unified user interface layer may enable a script to reference more than two different object description mechanisms.

Descriptive programming library 330 may store test object descriptions associated with descriptive programming statements. As an example, a user may type in a test object name and a test object description in a descriptive programming statement and the test object description may be stored in descriptive programming library 330. As another example, a user may enter a partial test object description into descriptive programming library. A partial test object description may include one or more dynamic properties. A dynamic property may be associated with a dynamic property value that is defined at run-time based on, for example, a value specified in a test script statement.

Object repository 340 may store test object descriptions. A test object description may be manually added to object repository 340. Additionally or alternatively, object repository 340 may be populated with test object descriptions by detecting application objects in application system 130 and by generating test object descriptions based on the detected application objects.

Utility and method library 350 may include a utility library of descriptive programming functions provided to testing script engine 310. Testing script engine 310 may identify a reference to a utility function from utility and method library 350 and may execute the utility function when the script is executed. Utility and method library 350 may include, for example, utility functions to return a stored test object description filtered based on a property specified in the reference to the utility function; return an array of object properties associated with a test object; replace a keyword in a stored test object description; add a property to a stored test object description; determine whether a particular property is included in a stored test object description; return a property value included in a stored test object description; and/or to perform another function relating to descriptive programming. Utility and method library 350 may also include method definitions associated with test object names applicable to test objects defined in both descriptive programming library 330 and object repository 340 through unified user interface Layer 330, which may allow methods by the same name to be shared between different test objects or to be customized for individual test objects.

Although FIG. 3 shows exemplary functional components of testing system 110, in other implementations, testing system 110 may include fewer functional components, different functional components, differently arranged functional components, or additional functional components than depicted in FIG. 3. Additionally or alternatively, one or more functional components of testing system 110 may perform functions described as being performed by one or more other functional components of testing system 110.

Figure 4:
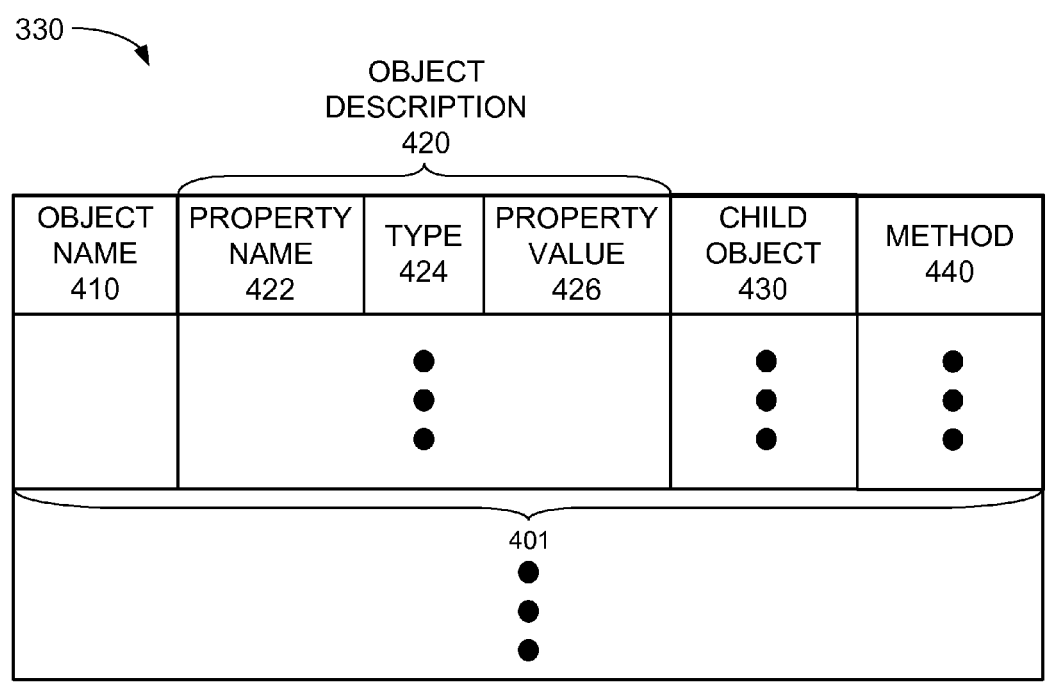
FIG. 4 is a diagram illustrating exemplary components that may be stored in the descriptive programming library of FIG. 3.

FIG. 4 is a diagram illustrating exemplary components that may be stored in descriptive programming library 330 according to an implementation described herein. As shown in FIG. 4, descriptive programming library 330 can include one or more object records 401. Each object record 401 may store information relating to a particular test object. Object record 401 may include an object name field 410, an object description field 420, one or more child object fields 430, and one or more method fields 440.

Object name field 410 may store a name for the particular test object. Object description field 420 may store the test object description for the particular test object. Object description field 420 may include one or more property name fields 422 and corresponding property type fields 424 and property value fields 426. Property name field 422 may store a property name for a particular property. Property type field 424 may store a property type for the particular property. The property type may indicate, for example, whether the property is a numerical value, a string value, etc. Property value field 426 may store a property value or a partially specified property value associated with the particular property. A partially specified value may contain keywords that are replaced at run time. Child object field 430 may identify child objects associated with the particular test object. Method field 440 may identify methods (e.g., functions) associated with the particular test object. The methods may be part of the utility and method library 350 and may be specified on object repository objects by leaving the object description 420 empty.

Although FIG. 4 shows exemplary components of descriptive programming library 330, in other implementations, descriptive programming library 330 may include fewer components, different components, differently arranged components, or additional components than depicted in FIG. 4.

Figure 5:
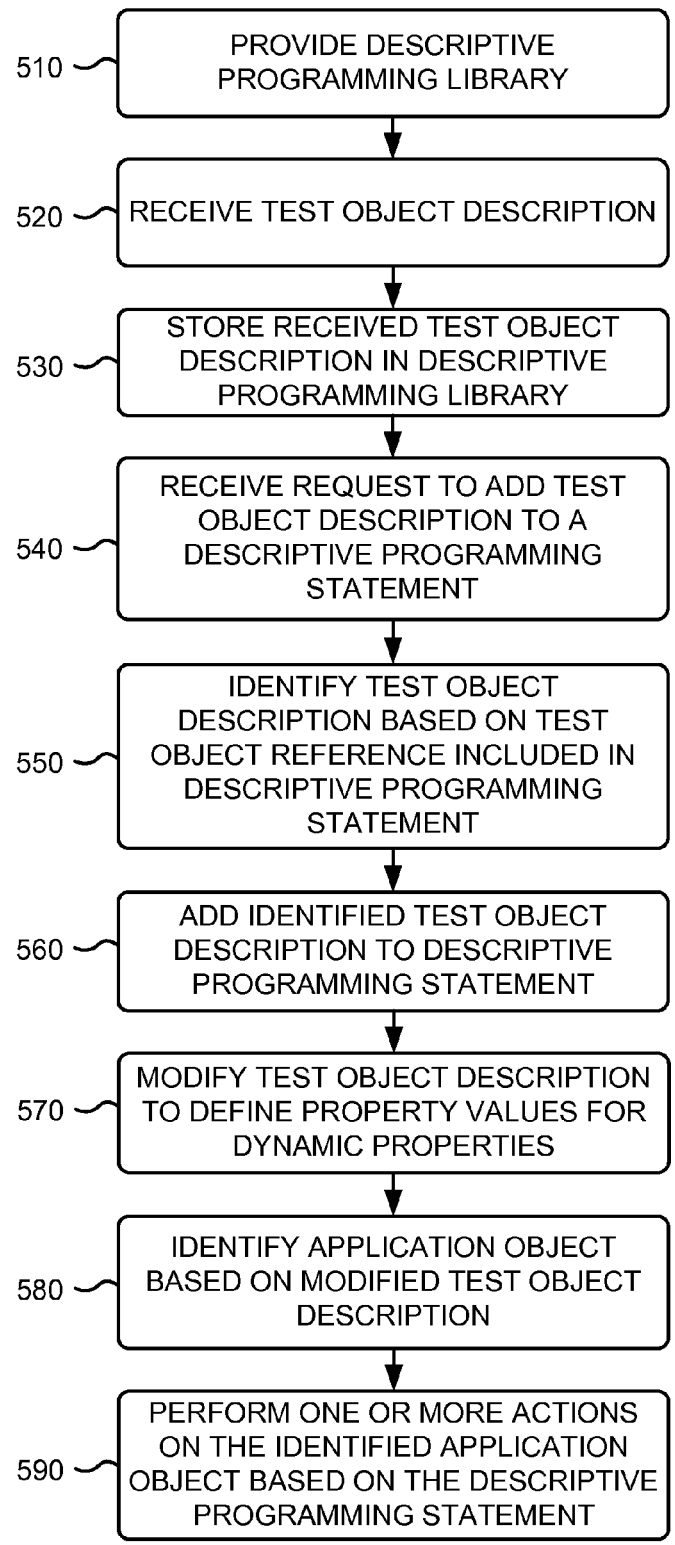
FIG. 5 is a flowchart for a first process of using a descriptive programming library according to an implementation described herein.

FIG. 5 is a flowchart for a first process of using a descriptive programming library according to an implementation described herein. In the process of FIG. 5, a test object description is added to a descriptive programming statement based on information stored in descriptive programming library 330. In some implementations, the process of FIG. 5 may be performed by testing system 110. In other implementations, some or all of the process of FIG. 5 may be performed by another device or a group of devices separate from or including testing system 110.

The process of FIG. 5 may include providing a descriptive programming library (block 510). For example, testing system 110 may provide descriptive programming library 330 to test script engine 310, enabling a user to store test object descriptions in descriptive programming library 330, retrieve test object descriptions from descriptive programming library 330, and/or to access stored test object descriptions in descriptive programming library 330 during script execution.

A test object description may be received (block 520) and stored in the descriptive programming library (block 530). As an example, a user may store a test object description directly in descriptive programming library 330. As another example, a user may enter a test object name and a test object description (e.g., one or more property names and corresponding property values) into a descriptive programming statement using a text editor associated with test script engine 310 and the test object description may be automatically stored in descriptive programming library 330. As yet another example, a user may enter a test object name and a test object description into a descriptive programming statement using a text editor associated with test script engine 310, may highlight (or otherwise select) the test object description, and may request to store the selected test object description in descriptive programming library 330. Furthermore, the user may select one or more properties included in the test object description as dynamic properties.

A request to add the test object description to a descriptive programming statement may be received (block 540). As an example, a user may enter a test object name into a text editor associated with test script engine 310 and test script engine 310 may access descriptive programming library 330 to determine whether a test object description exists for the entered test object name. As another example, a user may request to access a list of test object descriptions stored in descriptive programming library 330.

A test object description based on a test object reference included in the descriptive programming statement may be identified (block 550) and added to the descriptive programming statement (block 560). For example, test script engine 310 may identify a list of property names, and corresponding property values, associated with the test object name included in the text editor and may add the property names and property values into the text editor. The test object description may be modified to define property values for dynamic properties (block 570). For example, the user may enter (or change) one or more property values for dynamic properties associated with the test object description.

Furthermore, a descriptive programming statement may make use of one or more utilities from utility and method library 350. For example, the descriptive programming statement may call a utility functions to return a stored test object description filtered based on a property specified in the reference to the utility function; return an array of object properties associated with a test object; replace a keyword in a stored test object description; add a property to a stored test object description; determine whether a particular property is included in a stored test object description; return a property value included in a stored test object description; and/or to perform another function relating to descriptive programming.

An application object may be identified based on the modified test object description (block 580) and one or more actions may be performed on the identified application object based on the descriptive programming statement (block 590). For example, the descriptive programming statement may specify one or more actions that are to be performed on the test object (e.g., select the test object if the test object is selectable, input a string if the test object corresponds to an input type test object, etc.). When the script is executed by testing system 110, testing system 110 may identify an application object in application system 130 based on the modified test object description and may perform the specified one or more actions on the identified application object. Testing system 110 may then record the results of the one or more actions in application system 130 and may report the results to the user.

Figure 6:
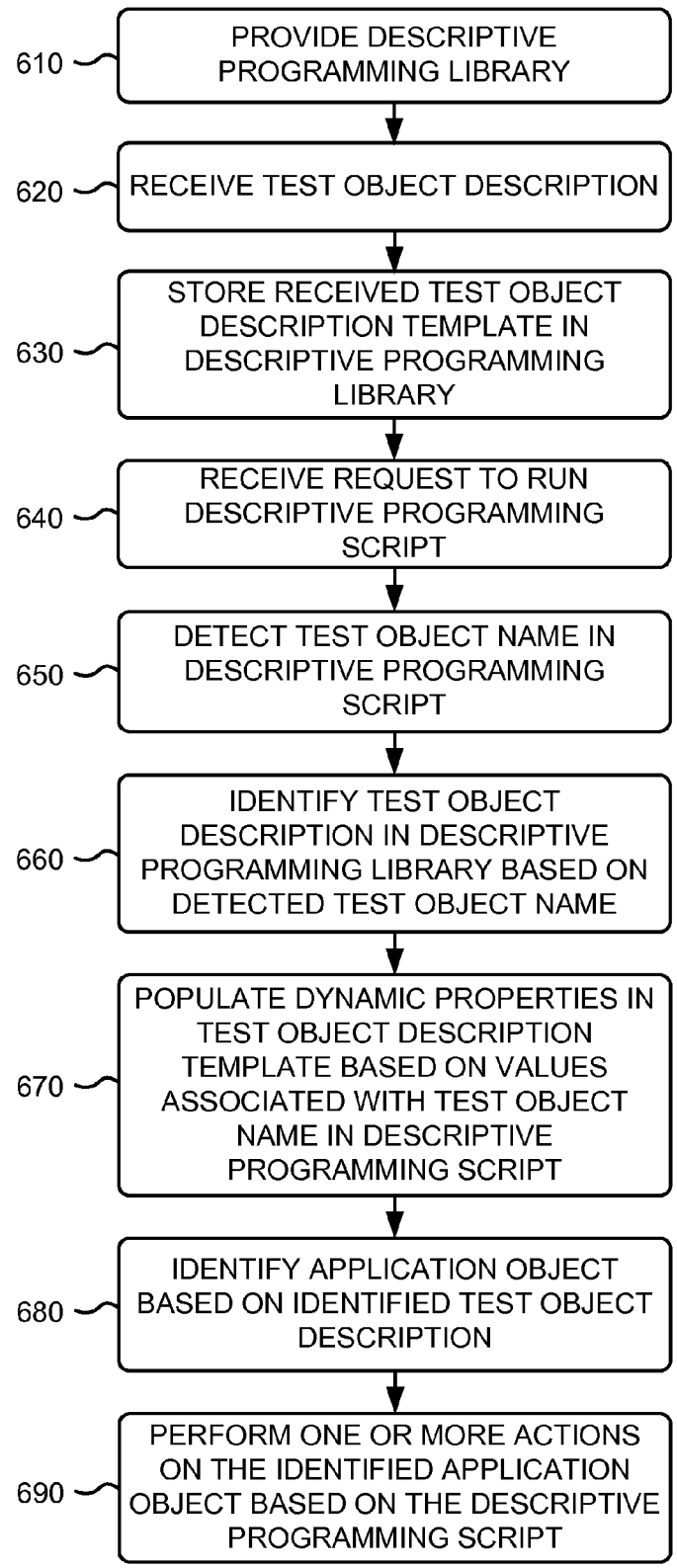
FIG. 6 is a flowchart for a second process of using a descriptive programming library according to an implementation described herein.

FIG. 6 is a flowchart for a second process of using a descriptive programming library according to an implementation described herein. In the process of FIG. 6, a test object description is not added to a descriptive programming statement. Rather, the test object description is accessed in descriptive programming library 330 when a testing script is being executed. In some implementations, the process of FIG. 6 may be performed by testing system 110. In other implementations, some or all of the process of FIG. 6 may be performed by another device or a group of devices separate from or including testing system 110.

The process of FIG. 6 may include providing a descriptive programming library (block 610). For example, testing system 110 may provide descriptive programming library 330 to test script engine 310, enable a user to store test object descriptions in descriptive programming library 330, retrieve test object descriptions from descriptive programming library 330, and/or to access stored test object descriptions in descriptive programming library 330 during script execution.

A test object description may be received (block 620) and a test object description template may be stored in the descriptive programming library (block 630). As an example, a user may store a test object description directly in descriptive programming library 330. As another example, a user may enter a test object name and a test object description (e.g., one or more property names and corresponding property values) into a descriptive programming statement using a text editor associated with test script engine 310 and the test object description may be automatically stored in descriptive programming library 330. As yet another example, a user may enter a test object name and a test object description into a descriptive programming statement using a text editor associated with test script engine 310, may highlight (or otherwise select) the test object description and may request to store the selected test object description in descriptive programming library 330. As yet another example, a user may define a unified user interface layer test object using unified user interface layer 320 and may store the defined unified user interface layer test object in descriptive programming library 330. Furthermore, the user may select one or more properties included in the test object description as dynamic properties by adding a template for the selected one or more properties that may be populated at run time with particular property values. Furthermore, a utility function and/or method from utility and method library 350 may be defined as a method for a test object in descriptive programming library 330.

A request to run a descriptive programming script may be received (block 640). For example, the user may request to execute a descriptive programming script and testing script engine 410 may process the descriptive programming script. A test object name in the descriptive programming script may be detected and a test object description based on the detected test object name may be identified (block 650). For example, test script engine 310 may detect a test object name, which does not include a test object description, in the descriptive programming script and may access descriptive programming library 330 to identify a stored test object description associated with the detected test object name.

Dynamic properties in the test object description template may be populated based on values associated with the test object name in the descriptive programming script (block 670). For example, the test object name in the descriptive programming script may be associated with one or more property values specified for one or more properties. Test script engine 410 may populate the specified one or more properties in the test object description template, associated with the test object, with the one or more property values when executing the script.

An application object may be identified based on the modified test object description (block 680) and one or more actions may be performed on the identified application object based on the descriptive programming script (block 690). For example, the descriptive programming script may specify one or more actions that are to be performed on the test object. When the script is executed by testing system 110, testing system 110 may identify an application object in application system 130 based on the modified test object description and may perform the specified one or more actions on the identified application object. Testing system 110 may then record the results of the one or more actions in application system 130 and may report the results to the user.

Figure 7:
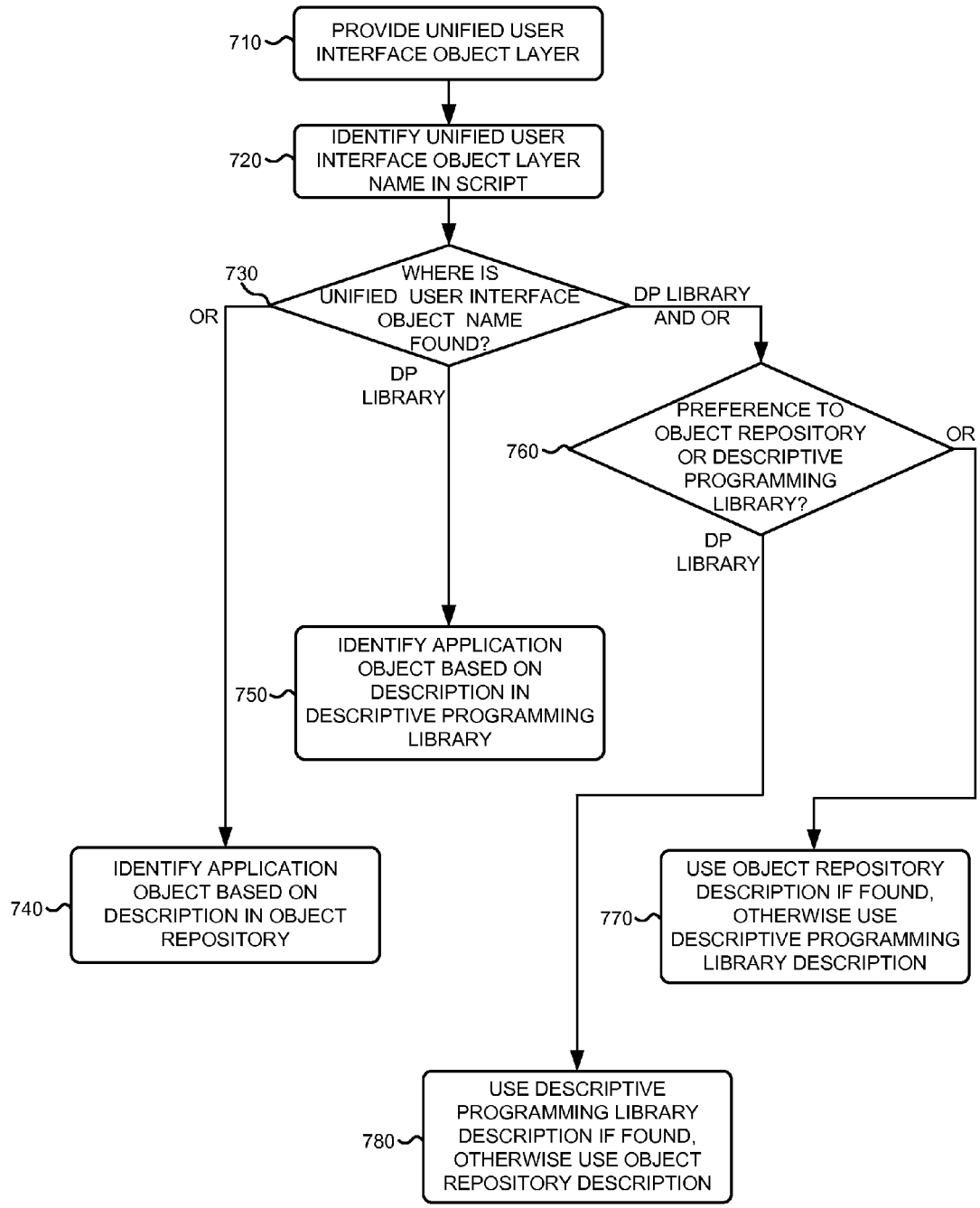
FIG. 7 is a flowchart for a process of using a unified user interface for descriptive programming and an object repository according to an implementation described herein.

FIG. 7 is a flowchart for a process of using a unified user interface for descriptive programming and an object repository according to an implementation described herein. In some implementations, the process of FIG. 7 may be performed by testing system 110. In other implementations, some or all of the process of FIG. 7 may be performed by another device or a group of devices separate from or including testing system 110.

The process of FIG. 7 may include providing a unified user interface object layer (block 710). For example, testing system 110 may provide descriptive programming library 330 to test script engine 310, enable a script to reference test object descriptions stored in the descriptive programming library and to also reference test object descriptions stored in an object repository.

As an example, a user may define a new unified user interface test object using a unified user interface syntax and may select to store the new unified user interface test object description in either object repository 340 or descriptive programming library 330. As another example, a descriptive programming test object description may be detected in a descriptive programming statement and the description may be stored in descriptive programming library 330 using the unified user interface syntax. As another example, test objects generated based on detected application objects using an application object detection tool may be stored in object repository 340 using the unified user interface syntax. As yet another example, test object descriptions stored in either descriptive programming library 330 or object repository 340 may be converted into unified user interface test objects using the unified user interface syntax.

A method inheritance syntax (e.g., similar to method inheritance syntax 862 shown in FIG. 8F and described below) may be used to inherit methods between objects defined in either descriptive programing library 330 or object repository 340. An object property inheritance may similarly be used to inherit test object properties between objects defined in either descriptive programing library 330 or object repository 340. Method and property inheritance may enable the user to maintain a hierarchy of test objects. A child object may inherit one or more properties from a parent object. Furthermore, the child object may inherit one or more methods from the parent object. As an example, the user may define a first method, and/or first property, for the first child object and may define a second method, and/or second property, for the second test object based on the first method via method inheritance. The unified user interface layer 320 may enable the method and property inheritance to be used between and among a mix of descriptive programing and object repository object definitions. Such a method and/or property hierarchy may be analogous to a class/subclass hierarchy in other object oriented programming, and may be orthogonal to the containment oriented hierarchy illustrated described below with reference to FIG. 8A (e.g., object repository test object reference 812, descriptive programming test object description 814, second descriptive programming test object description 816, and/or unified user interface test object 818). Inherited methods and/or properties may be identified for objects at the unified user interface layer and the identified methods and/or properties may be executed based on parameters included in a script statement.

A unified user interface object layer name may be identified in a script (block 720). For example, testing script engine 410 may identify, in a testing script, an object name in the syntax associated with unified user interface object layer 320. A determination may be made as to where the unified user interface object layer name in the script is found (block 730). For example, testing script engine 410 may access object repository 340 and descriptive programming library 330 to determine whether an object description associated with the identified object name is stored in either object repository 340 or descriptive programming library 330.

If the unified user interface object name is found in the object repository (block 730—OR), an application object may be identified based on a description in the object repository (block 740). For example, testing system 110 may retrieve the stored test object description from object repository 340 and may identify an application object in application system 130 using the test object description retrieved from object repository 340.

If the unified user interface object name is found in the descriptive programming library (block 730—DP LIBRARY), an application object may be identified based on a description in the descriptive programming library (block 750). For example, testing system 110 may retrieve the stored test object description from descriptive programming library 330 and may identify an application object in application system 130 using the test object description retrieved from descriptive programming library 330.

If the unified user interface object name is found in both the object repository and the descriptive programming library (block 730—DP LIBRARY AND OR), a determination may be made as to whether there is a preference for the object repository or for the descriptive programming library (block 760). For example, when a user generates a unified user interface object, or when an existing test object description is converted into a unified user interface object, a preference may be selected for the unified user interface object. The preference may indicate either object repository 340 or descriptive programming library 330. The test object description may be selected from either object repository 340 or descriptive programming library 330 based on the indicated preference.

If the preference is determined to be for the object repository (block 760—OR), an object repository test object description may be used, if found. Otherwise, a descriptive programming library test object description may be used (block 770). If the preference is determined to be for the descriptive programming library (block 760—DP LIBRARY), a descriptive programming library test object description may be used, if found. Otherwise, a test object description from the object repository may be used (block 780).

FIGS. 8A-8F are diagrams of exemplary testing scripts according to an implementation described herein. FIG. 8A illustrates a table 810 that shows exemplary test object descriptions for a test object corresponding to a web element in a web page of a browser. Table 810 illustrates an exemplary object repository test object reference 812. Table 810 further illustrates a first descriptive programming test object description 814 written in a first style (e.g., a static inline style) and a second descriptive programming test object description 816 (e.g., dynamic style using description objects). Table 810 further illustrates a unified user interface test object 818 that defines the web element as a child object of the page element, which is defined as the child object of the browser test object. Although the syntax of unified user interface test object 818 is different from the syntax of object repository test object reference 812 or first descriptive programming test object description 814, in other implementations, the syntax of unified user interface test object 818 may be different from the syntax of object repository test object reference 812 and/or first descriptive programming test object description 814.

FIG. 8B illustrates a table 820 that shows a set of descriptive programming statements 822 that use a description object to define an innertext object (e.g., the text between the start and end tags of an object). A description object may be used in descriptive programming to store the properties and values for a particular object in an instance of that object during run-time. Thus, a description object may be used to define dynamic properties. For comparison, table 820 illustrates an exemplary descriptive programming library style 824 that may be used to store the same innertext object in descriptive programming library 330. Table 820 further illustrates a utility tool function associated with a utility tool style 826 that uses a MakeDescription utility tool that returns a description object for the same innertext object from an array of attributes. Thus, as shown in FIG. 8B, the use of a descriptive programming library style and the utility tool style simplifies writing of test scripts (e.g., one line vs. three lines) while the descriptive programming library style provides a centralized store of descriptive programming test object descriptions.

FIG. 8C illustrates a table 830 that shows a set of descriptive programming statements 832 that use a description object to define an innertext object with dynamic properties. For comparison, table 830 also illustrates an exemplary descriptive programming library object 834, corresponding to the innertext object, that may be stored in descriptive programming library 330. Furthermore, FIG. 8C illustrates a unified user interface object 836 corresponding to the descriptive programing library object 834 that may be referenced in a descriptive programming statement. Both descriptive programming library object 834 and unified user interface object 836 involve partially specified descriptions, where @name@, @e@, and @i@ in descriptive programming library object 834 will be replaced at run time by the property values assigned to the name variable, namely "1" and "1", respectively, as shown in unified user interface object 836. FIG. 8C also illustrates utility tools 838 that may be used to define dynamic properties for the test object. For example, a GetDescDS utility tool may extract a specified object description while CopyDescription may copy an object description.

FIG. 8D illustrates a table 840 that shows a set of descriptive programming statements 842 that use a description object with a collection of child objects. For comparison, table 840 further illustrates a unified user interface object 844 that includes a collection of child objects and a utility tool 846 that includes a getTestObjects utility function to extract a collection of child objects from an object.

FIG. 8E illustrates a table 850 that shows an exemplary method definition syntax 852. Table 850 further shows exemplary method definitions 854 and method invocation statements in a unified syntax 856 that include calls to the defined methods. FIG. 8F illustrates a table 860 that shows an exemplary method inheritance syntax 862.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 5-7, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
providing, by a computer device, a descriptive programming library to a testing script engine, wherein the descriptive programming library stores test object descriptions for test objects associated with an application under testing;
providing, by the computer device, a unified user interface layer to the testing script engine, wherein the unified user interface layer enables a script to reference the test object descriptions stored in the descriptive programming library and to reference test object descriptions stored in an object repository, wherein the test object descriptions stored in the object repository are accessible without having to specify test object properties and the test object descriptions stored in the descriptive programming library are accessible using dynamic property values;

storing, by the computer device, a test object description, associated with a test object, in the descriptive programming library;

identifying, by the computer device, a reference to the test object in a descriptive programming statement associated with the testing script engine using the unified user interface layer;

accessing, by the computer device, the stored test object description in the descriptive programming library based on the identified reference to the test object;

identifying, by the computer device, an application object, associated with the application under testing, based on the stored test object description;

performing, by the computer device, a specified action on the identified application object using the testing script engine; and reporting, by the computer device, a result associated with the specified action to a user associated with the application under testing.

2. The method of claim 1, wherein identifying the application object, associated with the application under testing, based on the stored test object description includes:

adding the stored test object description to the descriptive programming statement.

3. The method of claim 1, wherein the reference to the test object in the descriptive programming statement includes a property value for a property associated with the test object, and wherein identifying the application object, associated with the application under testing, based on the stored test object description includes:

using the property value for the property associated with the test object.

4. The method of claim 1, further comprising:

providing a utility library of descriptive programming functions to the testing script engine;

identifying a reference to a utility function from the utility library in the descriptive programming statement; and executing the utility function based on identifying the reference to the utility function from the utility library in the descriptive programming statement.

5. The method of claim 4, wherein executing the utility function includes at least one of:

returning the stored test object description filtered based on a property specified in the reference to the utility function;

returning an array of object properties associated with the test object;

replacing a keyword in the stored test object description;

adding a property to the stored test object description;

determining whether a particular property is included in the stored test object description; or returning a property value included in the stored test object description.

6. The method of claim 1, further comprising:

detecting a reference to a unified user interface layer test object, generated via the unified user interface layer, in a script statement associated with the testing script engine;

determining whether the unified user interface layer test object is associated with the test object description stored in the descriptive programming library; and identifying an application object based on the test object description stored in the descriptive programming library, when the unified user interface layer test object is associated with the test object description stored in the descriptive programming library.

7. The method of claim 1, further comprising:

detecting a reference to a unified user interface layer test object, generated via the unified user interface layer, in a script statement associated with the testing script engine;

determining whether the unified user interface layer test object is associated with a test object description stored in the object repository; and identifying an application object based on the test object description stored in the object repository, when the unified user interface layer test object is associated with the test object description stored in the object repository.

8. The method of claim 1, further comprising:

detecting a reference to a unified user interface layer test object, generated via the unified user interface layer, in a script statement associated with the testing script engine;

determining that the unified user interface layer test object is associated with the test object description stored in the descriptive programming library and is associated with a test object description stored in the object repository;

determining a preference for either the descriptive programming library or the object repository for the unified user interface layer test object; and selecting the test object description stored in the descriptive programming library or the test object description stored in the object repository based on the determined preference.

9. The method of claim 1, further comprising:

defining a first test object using the unified user interface layer; and defining a second test object, using the unified user interface layer, as a child object of the first test object.

10. The method of claim 9, further comprising:

defining a first method for the first test object using the unified user interface layer; and defining a second method for the second test object based on the first method via method inheritance.

11. A computer device comprising:

logic configured to:

provide a descriptive programming library to a testing script engine, wherein the descriptive programming library stores test object descriptions for test objects associated with an application under testing;

provide a unified user interface layer to the testing script engine, wherein the unified user interface layer enables a script to reference the test object descriptions stored in the descriptive programming library and to reference test object descriptions stored in an object repository, wherein the test object descriptions stored in the object repository are accessible without having to specify test object properties and the test object descriptions stored in the descriptive programming library are accessible using dynamic property values;

store a test object description, associated with a test object, in the descriptive programming library;

identify a reference to the test object in a descriptive programming statement associated with the testing script engine using the unified user interface layer;

access the stored test object description in the descriptive programming library based on the identified reference to the test object;
identify an application object, associated with the application under testing, based on the stored test object description;
perform a specified action on the identified application object using the testing script engine; and
report a result associated with the specified action to a user associated with the application under testing.

12. The computer device of claim 11, wherein, when identifying the application object, associated with the application under testing, based on the stored test object description, the logic is further configured to:
add the stored test object description to the descriptive programming statement.

13. The computer device of claim 11, wherein the reference to the test object in the descriptive programming statement includes a property value for a property associated with the test object, and wherein, when identifying the application object, associated with the application under testing, based on the stored test object description, the logic is further configured to:
use the property value for the property associated with the test object.

14. The computer device of claim 11, wherein the logic is further configured to:
provide a utility library of descriptive programming functions to the testing script engine;
identify a reference to a utility function from the utility library in the descriptive programming statement; and
execute the utility function based on identifying the reference to the utility function from the utility library in the descriptive programming statement.

15. The computer device of claim 14, wherein, when executing the utility function, the logic is further configured to at least one of:
return the stored test object description filtered based on a property specified in the reference to the utility function;
return an array of object properties associated with the test object;
replace a keyword in the stored test object description;
add a property to the stored test object description;
determine whether a particular property is included in the stored test object description; or
return a property value included in the stored test object description.

16. The computer device of claim 11, wherein the logic is further configured to:
detect a reference to a unified user interface layer test object, generated via the unified user interface layer, in a script statement associated with the testing script engine;
determine whether the unified user interface layer test object is associated with the test object description stored in the descriptive programming library;
identify an application object based on the test object description stored in the descriptive programming library, when the unified user interface layer test object is associated with the test object description stored in the descriptive programming library; and
identify an application object based on the test object description stored in the object repository, when the unified user interface layer test object is associated with the test object description stored in the object repository.

17. The computer device of claim 16, wherein the logic is further configured to:
define a first test object using the unified user interface layer; and
define a second test object, using the unified user interface layer, as a child object of the first test object.

18. The computer device of claim 17, wherein the logic is further configured to:
define a first method for the first test object using the unified user interface layer; and
define a second method for the second test object based on the first method via method inheritance.

19. A non-transitory computer-readable memory device, storing instructions executable by a processor, the non-transitory computer-readable memory device comprising:
one or more instructions to provide a descriptive programming library to a testing script engine, wherein the descriptive programming library stores test object descriptions for test objects associated with an application under testing;
one or more instructions to provide a unified user interface layer to the testing script engine, wherein the unified user interface layer enables a script to reference the test object descriptions stored in the descriptive programming library and to reference test object descriptions stored in an object repository, wherein the test object descriptions stored in the object repository are accessible without having to specify test object properties and the test object descriptions stored in the descriptive programming library are accessible using dynamic property values;
one or more instructions to provide a unified user interface layer to the testing script engine, wherein the unified user interface layer enables a script to reference the test object descriptions stored in the descriptive programming library and to reference test object descriptions stored in an object repository;
one or more instructions to store a unified user interface layer test object, generated via the unified user interface layer, in the descriptive programming library;
one or more instructions to identify a reference to the unified user interface layer test object in a descriptive programming statement associated with the testing script engine using the unified user interface layer;
one or more instructions to access the stored unified user interface layer test object in the descriptive programming library based on the identified reference to the unified user interface layer test object;
one or more instructions to identify an application object, associated with the application under testing, based on the stored unified user interface layer test object;
one or more instructions to perform a specified action on the identified application object using the testing script engine; and
one or more instructions to report a result associated with the specified action to a user associated with the application under testing.

20. The non-transitory computer-readable memory device of claim 19, further comprising:
one or more instructions to detect a reference to a unified user interface layer test object, generated via the unified user interface layer, in a script statement associated with the testing script engine;
one or more instructions to determine that the unified user interface layer test object is associated with the test object description stored in the descriptive programming library and is associated with a test object description stored in the object repository;

one or more instructions to determine a preference for either the descriptive programming library or the object repository for the unified user interface layer test object; and one or more instructions to select the test object description stored in the descriptive programming library or the test object description stored in the object repository based on the determined preference.

* * * * *